United States Patent [19]

Hughes et al.

[11] Patent Number: 5,360,570

[45] Date of Patent: Nov. 1, 1994

[54] MALEATE POLYMERIZATION PROCESS

[75] Inventors: Kathleen A. Hughes; Graham Swift, both of Blue Bell, Pa.

[73] Assignee: Rohm and Haas Company, Philadelphia, Pa.

[21] Appl. No.: 81,458

[22] Filed: Jun. 22, 1993

Related U.S. Application Data

[60] Division of Ser. No. 502,100, Mar. 30, 1990, Pat. No. 5,244,988, which is a continuation of Ser. No. 353,376, May 17, 1989, abandoned.

[51] Int. Cl.$^5$ .................................................. C11D 1/08
[52] U.S. Cl. .................................... 252/135; 252/142; 252/174.18; 252/174.23; 252/174.24; 252/DIG. 2; 252/DIG. 15
[58] Field of Search ................... 252/174.24, 174.23, 252/DIG. 2, 174.18, 135

[56] References Cited

U.S. PATENT DOCUMENTS

| | | | |
|---|---|---|---|
| 4,314,044 | 2/1982 | Hughes et al. | 524/808 |
| 4,659,793 | 4/1987 | Yang | 526/91 |
| 4,725,655 | 2/1988 | Denzinger et al. | 526/65 |
| 4,871,823 | 10/1989 | Billman et al. | 526/272 |
| 4,897,220 | 1/1990 | Trieselt et al. | 252/546 |
| 4,919,845 | 4/1990 | Vogt et al. | 252/526 |

*Primary Examiner*—Mark Nagumo
*Attorney, Agent, or Firm*—James G. Vouros

[57] ABSTRACT

Copolymers of aliphatic monoethylenically unsaturated dicarboxylic acids and unsaturated monomers have been formed by gradually and simultaneously adding monomers and initiator, in the presence of a metal salt activator, to a reaction vessel initially containing water at a temperature suitable for polymerization. These copolymers have consistent compositions and superior properties as antiscalants, dispersants and incrustation inhibitors.

9 Claims, 1 Drawing Sheet

Figure I
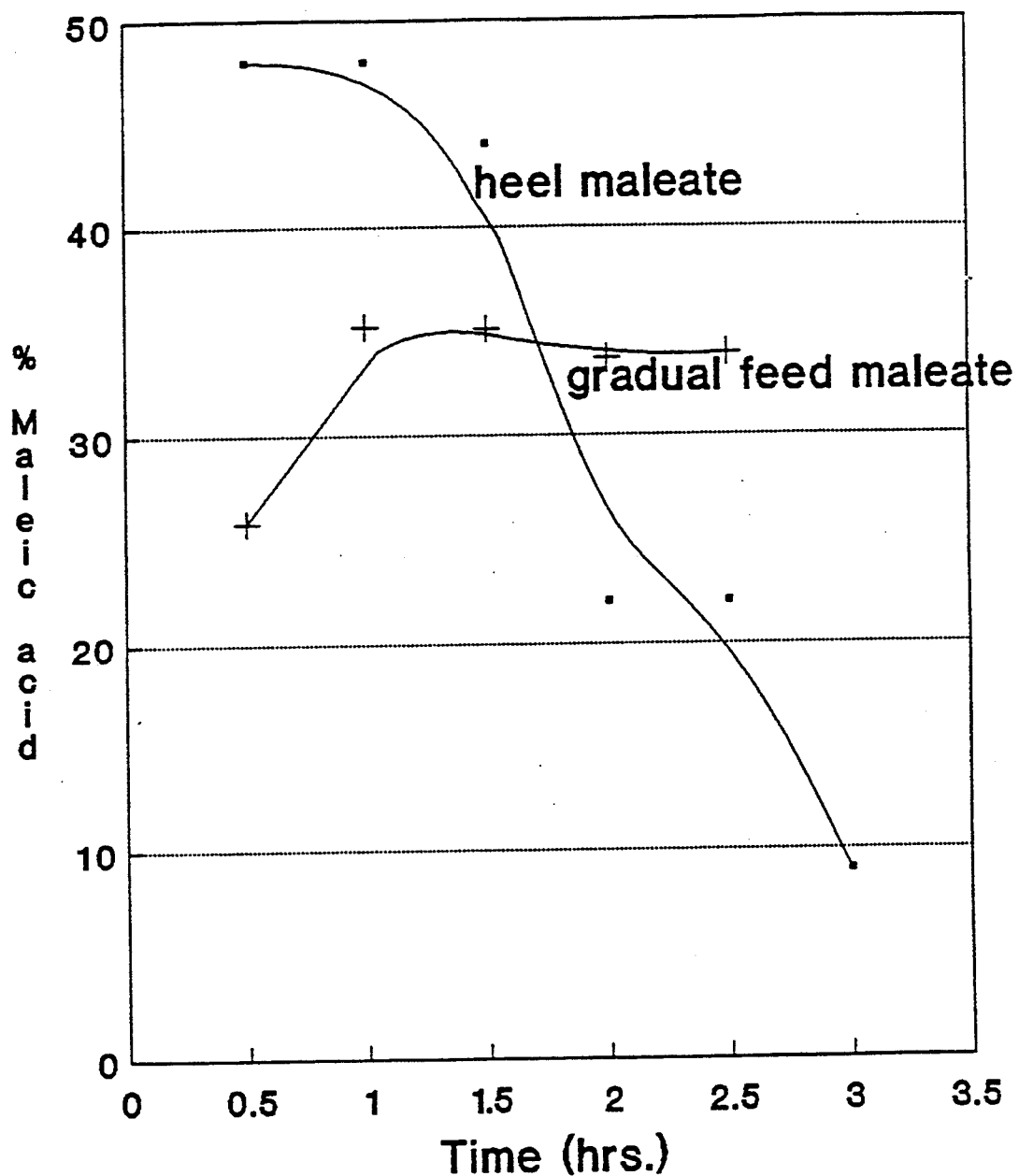

MALEATE POLYMERIZATION PROCESS

This is a divisional of U.S. patent application Ser. No. 502,100, filed Mar. 30, 1990, now U.S. Pat. No. 5,244,988, which is a continuation-in-part of U.S. patent application Ser. No. 353,376, filed May 17, 1989, now abandoned.

FIELD OF THE INVENTION

This invention relates to novel copolymers containing as copolymerized monomer units aliphatic monoethylenically unsaturated dicarboxylic acids, such as maleic acid, monoethylenically unsaturated monocarboxylic acids such as acrylic acid and monoethylenically unsaturated carboxyl-free monomers, such as alkyl esters of acrylic acid, and to the process of producing these polymers. These copolymers show superior properties as antiscalants, dispersants and incrustation inhibitors.

BACKGROUND OF THE INVENTION

Copolymers of monoethylenically unsaturated dicarboxylic acids, monoethylenically unsaturated monocarboxylic acids and monoethylenically unsaturated carboxyl-free monomers are useful as antiscalants, dispersants, incrustation inhibitors in detergents, deflocculants and drilling fluid aids. Several techniques employing aqueous solvent systems have been described heretofore for the preparation of these copolymers, including both batch and continuous processes.

The previous art relating to copolymers of the type involved in the present invention recognized the large differences in the reactivity between dicarboxylic monomers such as maleic acid and monocarboxylic monomers such as acrylic acid. In order to obtain complete or nearly complete polymerization of the maleic acid, batch processes using a maleic acid salt "heel" to which is slowly fed the faster polymerizing acrylic acid monomer were the conventional method of manufacturing these copolymers (U.S. Pat. No. 4,659,793). A more recent continuous process uses a long residence time in a complex series of "cascading" reactors (U.S. Pat. No. 4,725,655).

Previously, copolymer solutions produced according to the batch "heel type" processes suffered from high levels of unreacted dicarboxylic acid which decreased the effectiveness of the copolymer in certain applications. This problem was presumably solved in U.S. Pat. No. 4,659,793 which describes an aqueous batch process for the preparation of copolymers of monoethylenically unsaturated aliphatic dicarboxylic acids, such as maleic acid, itaconic acid, mesaconic acid, fumaric acid, methylene malonic acid, citraconic acid and their monoalkali metal or monoammonium salts, with $\alpha,\beta$-ethylenically unsaturated monomers having carboxyl groups such as methacrylic acid or sulfonic groups such as 2-acrylamido-2-methyl propane sulfonic acid. By using a water-soluble radical generating initiator such as hydrogen peroxide in concentrations from 0.5 to 10% by weight of the total monomer concentration, from 1 to 250 ppm metal ions, such as ferrous or ferric ions, and controlling the pH in the range of 2 to 7, this procedure was presumably successful in reducing the residual unpolymerized dicarboxylic acid level to less than 0.5% while maintaining control of the copolymer molecular weight. The total monomer concentration was from 10 to 70% by weight of the dicarboxylic acid of 4 to 6 carbon atoms per molecule and from 30 to 90% by weight of the ethylenically unsaturated monomers of 3 to 10 carbon atoms per molecule.

In a typical batch procedure described in U.S. Pat. No. 4,659,793, a reactor was charged with the dicarboxylic acid along with the metal ion salt. The reaction mixture was heated from 40 to 150° C. and the initiator and the $\alpha,\beta$-ethylenically unsaturated monomer in an aqueous solution were then added to the heated reaction mixture over 3 to 10 hours. However, because the reaction process begins with the monoethylenically unsaturated dicarboxylic acid already in the reaction vessel and where the monocarboxylic acid is added along with the initiator over a designated time interval, copolymers with compositions that are changing throughout the reaction are synthesized. During the first stages of the reaction the dicarboxylic acid is present in a high concentration leading to the production of a copolymer composed primarily from the dicarboxylic acid. As the monomer content of the reaction solution changes, increasing in concentration of the added monomer, the composition of the initially manufactured polymer changes, increasing in concentration of the added monomer. Similarly, in the final stages of the reaction, since most of the dicarboxylic acid has been polymerized and the added monomer is now present in a higher concentration relative to the dicarboxylic acid, the composition of the copolymer formed at that stage is primarily made up from the added monocarboxylic monomer.

Another disadvantage of the heel method discussed in U.S. Pat. No. 4,659,793 is that to achieve the more desirable low molecular weight copolymers, a higher level of metal ion is needed during the reaction. However, this is ecologically undesirable since the metal remains in the final product and may eventually find its way into the environment.

Another process for the synthesis of these polymers is a continuous cascade process, disclosed in U.S. Pat. No. 4,725,655, which claims to be faster and more economical than a batch process. Described in this patent is the copolymerization of monoethylenically unsaturated dicarboxylic acids containing from 4 to 6 carbon atoms per molecule in concentrations of from 10 to 60% by weight of the monomers, monoethylenically unsaturated monocarboxylic acids containing from 3 to 10 carbon atoms per molecule in concentrations of 40 to 90% by weight of the monomers and optionally carboxyl-free monomers in concentration of not more than 20% by weight of the monomers. This process, which can only be run continuously, begins by charging all the reaction vessels, typically three, with an aqueous solution of a copolymer of monoethylenically unsaturated mono- and dicarboxylic acids prepared by a batch process according to U.S. patent application Ser. No. P 3,147,489.6. Starting copolymers of similar composition to those being synthesized are used. The reactors are then heated from 60 to 150° C. and the dicarboxylic acid and at least 40% of the monocarboxylic acid are introduced into the first reactor along with from 0.5 to 6.0% initiator and enough neutralizing solution to neutralize from 20 to 80% of the acids. Additional amounts of monocarboxylic acid and initiator are added to the second reactor or distributed between all the downstream reactors. If a comonomer of a carboxyl-free monomer is used, it can be fed into the first reactor or a combination of the first reactor and the downstream reactors. The total amount of monomer used is from 20 to 70% of the total weight of the aqueous solution. The reaction solution is removed from the last reactor after a residence time of from 0.5 to 8 hours.

Similar to the batch process described above, this process also leads to a polymer with a mixed composition. This is partly due to the fact that the initial charge copolymer was synthesized using a batch process, producing copolymers with a skewed compositions. Also, even though all the monomers can be added simultaneously to the first reactor leading to a more consistent composition, once the copolymer enters the second reactor and only monocarboxylic acid and/or carboxyl-free monomers are being added into this reactor, the composition changes and is composed primarily from the added monomers. The multiple reactors and the equipment required for this process, together with the control problems associated with the process, are thought to be disadvantageous in regard to the efficiency of the process and the consistency of the copolymer composition.

It is the object of the present invention to provide a relatively uncomplicated process capable of yielding a polymer with a more consistent composition in the hope that a more consistent polymer composition would enhance the properties of these copolymers. It is a further object of the present invention to provide a process whereby the molecular weight of the copolymer can be controlled while both the level of residual monomer and the amount of metal remaining in the final product are kept at an ecologically acceptable level.

SUMMARY OF THE INVENTION

The present invention provides an aqueous batch or continuous process for the preparation, at high conversion, of copolymers of consistent composition of aliphatic monoethylenically unsaturated dicarboxylic acids, especially maleic acid, with unsaturated monomers, including monomers with monocarboxylic acid and carboxyl-free functionality such as acrylic acid and alkyl esters of acrylic acid. This novel, totally continuous process, leads to copolymers with a more consistent composition as compared to copolymers made from the prior art processes using the same monomers. In addition, the present invention allows for the molecular weight of the copolymer to be controlled while both the level of residual monomer and amount of metal in the reaction product are kept at an acceptably low level.

We have now found that the objects of this invention can be achieved in either a continuous or a batch process whereby, to a reactor charged with water and in the presence of a metal salt activator, is gradually added at substantially uniform rates, preferably linearly and separately, three solutions, one containing the monomers, one containing the initiators, and one containing a neutralizer. The metal salt activator can be simultaneously cofed into the reaction vessel, contained in the initial charge, added after the addition of the monomers or a combination thereof. An alternate variation involves combining two or more of the three solutions prior to addition to the reactor, and a further alternative involves the addition of the monomers as separate solutions.

These copolymers synthesized according to our process can be used as antiscalants and incrustation inhibitors.

BRIEF DESCRIPTION OF THE FIGURE

FIG. 1 is graph of maleic acid monomer level versus reaction time for both the heel process and the gradual feed process. In the heel process the level of maleic acid monomer decreases versus reaction time while in the graduate feed process the maleic acid monomer level remains constant.

DETAILED DESCRIPTION OF THE INVENTION

We have discovered that novel copolymers of consistent and relatively uniform composition can be synthesized according to the process described in this invention. Copolymers of monoethylenically unsaturated dicarboxylic acids, monoethylenically unsaturated monocarboxylic acids and monoethylenically unsaturated carboxyl-free monomers, having a weight average molecular weight from about 1000 to 100,000 are formed by the addition, at substantially uniform addition rates, at least initially, of these monomers along with water-soluble, free radical forming initiators into a reaction vessel.

Initially, the reactor is charged only with water or an aqueous solution of a metal salt activator, and is heated to an increased temperature. The metal salt activator can be simultaneously cofed into the reaction vessel, contained in the initial charge, added after the addition of one or more of the monomers or a combination thereof. Monomer, initiator and neutralizer are then added at a substantially uniform rate, whereby a substantially uniform addition rate can comprise of the simultaneous, linear addition of the cofed solutions or the addition of the cofed solutions at slightly different rates and times.

Three solutions are cofed into the reaction vessel, the monomer solution, the initiator solution and the neutralizer solution. An alternate variation involves combining two or more of the three solutions prior to addition to the reactor, and a further, preferred alternative involves the addition of the monomers as separate solutions. The rate and time of addition of the monomers and initiator can be varied to account for the differences in reactivity of the monomers and thereby maximize the conversion of the monomers. This process can be run either as a batch or as a continuous process, the continuous process being preferred.

The ratio of monomers added to the reaction flask corresponds to the ratio contained in the final copolymer product. When the monomers are added as separate cofeeds, they are added at a substantially uniform addition rate, whereby a substantially uniform addition rate refers to the addition of the majority of the monomers or monomer solutions simultaneously and linearly. Generally, if the monomers used have the same rate of reactivity, it is desirable to start the addition of the solutions at about the same time and finish the addition of the solutions at about the same time. However, when the reactivity of the monomers differ, the rate of addition may be varied to compensate for this difference in reactivity. When monomers of different reactivity are used, the monomers or monomer solutions can be started at the same time, but it is desirable to add slower reacting monomers over a shorter period of time as compared to the time of addition of faster reacting monomers. Therefore, the addition of slower reacting monomers will be completed before the addition of faster reacting monomers. Although it is dependent on the rate of reactivity of the monomers, it is more preferred to add slower reacting monomers to the reaction flask in from about 25% to 75% of the time that faster reacting monomers are added. Accordingly, as used herein, the expression "substantially uniform addition rate" is intended to relate to a monomer addition rate to the polymerization reactor, under polymerization conditions, of at least two comonomers, added simultaneously for at least 25% of the time and preferably at least 75% of the total period of monomer addition.

Simultaneous addition of monomers (or alternatively "cofeed") is often followed by a "chase" or finishing polymerization step to reduce unpolymerized, slower reacting monomer by means well known to the polymerization art, such as (a) post-addition of the faster reacting monomers, (b) elevating the polymerization temperature, (c) post-addition of an initiator (catalyst) or combination of these or other techniques.

Starting comonomers used in the process are monoethylenically unsaturated dicarboxylic acids containing from 4 to 6 carbon atoms per molecule, their alkali metal and ammonium salts, and the anhydrides of the cis dicarboxylic acids. Examples of suitable monomers include maleic acid, itaconic acid, mesaconic acid, fumaric acid, citraconic acid and the anhydrides of cis dicarboxylic acids, such as maleic anhydride. Maleic anhydride is the most preferable of these monomers. The monoethylenically unsaturated dicarboxylic acid concentration can be from 5 to 65% and preferably from 10 to 60% by weight of the total monomer concentration.

Starting comonomers include monoethylenically unsaturated monocarboxylic acids containing from 3 to 6 carbon atoms per molecule and include acrylic acid, methacrylic acid, vinyl acetic acid, crotonic acid and acryloxypropionic acid. The most preferred monoethylenically unsaturated monocarboxylic acid is acrylic acid. The concentration of these monomers is from 35 to 95% and preferably from 40 to 90% by weight of the total monomer concentration.

Other starting monomers can be unsaturated carboxyl-free monomers which include alkyl esters of acrylic or methacrylic acids such as methyl acrylate, ethyl acrylate, butyl acrylate, methyl methacrylate. ethyl methacrylate, butyl methacrylate and isobutyl methacrylate; hydroxyalkyl esters of acrylic or methacrylic acids such as hydroxyethyl acrylate, hydroxypropyl acrylate, hydroxyethyl methacrylate, and hydroxypropyl methacrylate; acrylamide, methacrylamide, N-tertiary butyl acrylamide, N-methyl acrylamide, N,N-dimethyl acrylamide; acrylonitrile, methacrylonitrile, allyl alcohol, allyl sulfonic acid, allyl phosphonic acid, vinylphosphonic acid, dimethylaminoethyl acrylate, dimethylaminoethyl methacrylate, phosphoethyl methacrylate, N-vinyl pyrollidone, N-vinylformamide, N-vinylimidazole, ethylene glycol diacrylate, trimethylolpropane triacrylate, diallyl phthalate, vinyl acetate, styrene, vinyl sulfonic acid and its salts, and 2-acrylamido-2-methyl propane sulfonic acid (AMPS) and its salts. The concentration of carboxyl-free monomer can be up to about 80% by weight of the total monomer concentration. The concentration is typically up to 35%, and is dependent upon the solubility of the particular monomer in the reaction mixture.

The water-soluble initiators which may be used include hydrogen peroxide, t-butyl hydroperoxide, sodium persulfate, potassium persulfate, ammonium persulfate, sodium perphospate, ammonium perphospate, potassium perphospate, 2,2-azobis(cyanovaleric acid) or combinations thereof. It has been found the advantageous properties of several of the initiators can be taken advantage of by using them in combination. For example, hydrogen peroxide affords good molecular weight control but at some sacrifice to monomer conversion, while sodium persulfate affords high conversion of monomer to polymer but at some sacrifice to molecular weight control. By combining initiators such as hydrogen peroxide and sodium persulfate, the desirable properties of molecular weight control and high conversion of monomer to polymer can be achieved. The more preferred initiator system is a combination of hydrogen peroxide and sodium persulfate. The total initiator concentration is from 0.5 to 20% and preferably from 1 to 10% based on the total weight of the monomers.

Metal salt activators that may be used in this copolymerization include water soluble salts of cobalt, iron, copper, nickel, manganese, zirconium and zinc or combinations thereof. Exemplary of the metal salts are cupric sulfate pentahydrate, ferrous sulfate heptahydrate, cuprous acetate, ferrous acetate, manganese acetate, cerium (IV) sulfate, calcium acetate, calcium sulfate, calcium nitrate, zinc acetate, zinc chloride, titanium (III) chloride, titanium (IV) chloride, lead (II) acetate, lead (IV) acetate, cuprio acetate, ferric acetate hydroxide, ferrous and ferric chloride, ferrous and ferric phosphate, cuprous and cupric chloride, cuprous and cupric bromide, cupric nitrate, ferric sulfate, manganese bromide manganese chloride, cobalt (II) acetate, cobalt (II) chloride, cobalt (II) nitrate, cobalt (II) sulfate, cerium (III) chloride, cerium (III) nitrate, cerium (III) sulfate, zinc nitrate, zinc phosphate, zinc sulfate, manganese nitrate, manganese sulfate, lead (II) chloride, lead (II) nitrate, and the like. The more preferred metal salt activators are the copper containing compounds. It has been found that copper is unique in its ability to control molecular weight and the degree of branching, while maintaining a high conversion of monomer to polymer. This is discussed further in copending U.S. patent application Ser. No. 475,580, filed on Feb. 6, 1990, now U.S. Pat. No. 5,055,540 and commonly assigned to the same assignee as the present invention. The preferred concentration of the salts are from 1 to 200 ppm, preferably from 1 to 25 ppm, based on the total weight of the monomers.

The metal salt activator helps to control the molecular weight of the polymers. Generally, the higher the metal salt activator concentration, the lower the molecular weight. The lower molecular weight copolymers are the more desirable. However, since the metal salt activator remains in the copolymer during use, and due to current ecological concerns, it is most desirable to limit the amount of metal present in the reaction and therefore limit the amount that ultimately gets into the environment. Therefore, through the optimization of the reaction conditions and the use of, although not limited to, a combination of initiators, the more desirable low molecular weight copolymers can be formed at high conversion using low levels of metal initiator. Even though the metal salt activator can be contained in the initial reactor charge, simultaneously cofed into the reactor vessel added after the addition of one or more of the monomers, the more preferred time for the addition of the metal salt activator is after the dicarboxylic acid has been added and the more preferred addition technique is to added the metal activator (in an aqueous solution) all at one time.

The polymerization is run to about 20 to 80% solids and most preferably to about 30 to 65% solids. Polymerization temperatures are between from 80 to 150° C., preferably from 90 to 120° C. When run in the batch mode, monomer addition rates are from 1 to 10 hours, preferably from 1 to 4 hours, and when run as a continuous process, residence times of at least 30 minutes should be used. If residual monomer levels are higher than desired, a post-polymerization addition of initiator, or initiator and a monomer are used.

The in-process neutralization solution of from 20 to 80 equivalent percent of base, preferably 40 to 60 percent base, based on the acid content of the monomer mixture, is added to the reactor linearly throughout the polymerization. The pH of the reaction solution is maintained in the range of from 3 to 7 and most preferably from 4 to 6. Suitable bases include, sodium hydroxide, potassium hydroxide and ammonium hydroxide. A preferred alternative to adding the neutralizing solution as a separate feed is to combine it with the dicarboxylic acid.

An advantage of this process is that the relative concentration of monomers in the reaction solution is maintained at a constant ratio to each other and therefore the copolymer so formed has a uniform and consistent composition, as demonstrated by sampling the reaction medium at various times during the course of the reaction and monitoring the monomer composition of the reaction vessel by HPLC. Similar sampling of reactions run according to previously described "heel" methods show that in the early stages of the reaction a polymer with a high composition of the monomer initially charged in the reactor is formed. As the reaction proceeds, the composition of the polymer increases in the content of the monomer being added until the polymer being formed in the final stages of the reaction consists predominantly of the monomer being added. These results are depicted in FIG. 1.

The copolymers of this invention can be added to detergent compositions in concentrations of up to 35% by weight, preferably from 0.1 to 20% by weight, and most preferably from 0.5 to 5.0% by weight to enhance incrustation inhibition. The compositions can include both a synthetic builder and a water soluble organic detergent compound; such as the anionic, nonionic, zwitterionic, and ampholytic detergent compounds. The chemical nature of these detergent compounds is not an essential feature of the present invention since these are well known to those skilled in the detergent art.

Examples of the builder compounds used in the detergent composition of the current invention can include the alkali metal salts of carboxymethyloxysuccinic acid and oxydiacetic acid, tetrasodium and tetrapotassium pyrophosphate, pentasodium and pentapotassium tripolyphosphates, ether polycarboxylates, citrates, starch or cellulose derived from polycarboxylates, polyacrylic acids and the like. Other materials which may be present in the detergent composition are those conventionally present therein. Typical examples thereof include soil suspending agents, hydrotropes, corrosion inhibitors, dyes, perfumes, fillers, abrasives, optical brighteners, enzymes, suds boosters, suds dispersants, germicides, anti-tarnishing agents, cationic detergents, softeners, chlorine releasing agents, buffers and the like. The balance of the detergent composition is water.

The detergent composition of the present invention may be in any of the usual physical forms of such compositions, such as powders, beads, flakes, bars, tablets, noodles, liquids, pastes, and the like. The detergent compositions are prepared and utilized in the conventional manner.

An additional advantage of the polymers of this invention is that they are somewhat biodegradable. A biodegradable synthetic polymeric detergent additive is preferred since the use of nonbiodegradable polymeric additives can lead to environmental problems due to the buildup of polyacids.

EXAMPLE 1

To a three liter four neck flask equipped with a mechanical stirrer, reflux condenser and addition funnels, were added 350 grams of deionized water and 8 grams of a 0.15% by weight solution of iron sulfate heptahydrate dissolved in deionized water. This solution was heated to $90° \pm 3°$ C., at which time a monomer solution of 230 grams of deionized water, 325 grams of glacial acrylic acid and 147.8 grams of maleic anhydride, an initiator solution of 75 grams of deionized water, 25 grams of sodium persulfate and 16.7 grams of 30% hydrogen peroxide and a neutralizing solution of 300 grams of 50% sodium hydroxide, 50 equivalent percent based on the monomers, were fed into the flask linearly and separately over 2.5 hours while maintaining the temperature at $90° \pm 3°$ C. When the addition was complete, the system was cooled to 70° C. over 30 minutes. At 70° C., the solution pH was adjusted to about 7 with the addition of 280 grams of a 40% solution of NaOH in water.

The resultant pH 7 polymer solution had a solids content of 39.5% and a Brookfield viscosity of 460 cps. at 25° C. Based on gel permeation chromatography (GPC), the weight average molecular weight (Mw) was 11,900 and the number average molecular weight (Mn) was 4,310. Residual maleic acid content was 0.5% and residual acrylic acid content was less than 0.01%. The biodegradation of the resultant polymer was 3.3% based on a BOD test conducted for 30 days.

EXAMPLE 2

The procedure of Example 1 was repeated except that 25 grams of sodium persulfate dissolved in 75 grams of distilled water was added as the initiator solution. The resultant pH 7.1 polymer solution had a solids content of 40.0% and a Brookfield viscosity of 1700 cps. at 25° C. Based on GPC, the Mw was 27,500 and the Mn was 5,340. Residual maleic acid content was 0.7% and residual acrylic acid content was less than .02%.

EXAMPLE 3 (Comparative)

The procedure of Example 1 was repeated except that the neutralizing solution contained 572 grams of 50% sodium hydroxide, 95 equivalent percent based on the monomers, and the post-polymerization neutralization was not preformed. The resultant pH 7.8 polymer solution had a solids content of 41.0% and a Brookfield viscosity of 170 cps at 25° C. Based on GPC, the Mw was 5,440 and the Mn was 1,930. Residual maleic acid content was 4.2% and residual acrylic acid content was less than 0.02%.

EXAMPLE 4 (Comparative)

The procedure of Example 1 was repeated except that the neutralizing charge solution was not used. The post-polymerization neutralization solution was increased to 560 grams of a 40% solution of sodium hydroxide in water. The resultant pH 7.7 polymer solution had a solids content of 41.5% and a Brookfield viscosity of 250 cps. at 25° C. Based on GPC, the Mw was 10,100 and the Mn was 5,900. Residual maleic acid content was greater than 5% and residual acrylic acid content was 0.3%.

EXAMPLE 5

To a three liter four neck flask equipped with a mechanical stirrer, reflux condenser and addition funnels, were added 350 grams of deionized water and 8 grams of a 0.15% by weight solution of iron sulfate heptahydrate dissolved in deionized water. This solution was heated to 90°±3° C., at which time a monomer solution of 240 grams of deionized water, 275 grams of glacial acrylic acid, 147.8 grams of maleic anhydride and 50 grams of vinyl acetate, an initiator solution of 75 grams of deionized water, 25 grams of sodium persulfate and 16.7 grams of 30% hydrogen peroxide and a neutralizing solution of 273 grams of 50% sodium hydroxide, 50 equivalent percent based on the concentration of acrylic acid and maleic anhydride, were fed into the flask linearly and separately over 2.5 hours, maintaining the temperature at 90°±3° C. When the addition was complete, the system was cooled to 70° C. over 30 minutes. At 70° C., the solution pH was adjusted to about 7 with the addition of 230 grams of a 50% solution of NaOH in water.

The resultant pH 7.4 polymer solution had a solids content of 41.7% and a Brookfield viscosity of 890 cps. at 25° C. Based on GPC, the Mw was 15,500 and the Mn was 5,460. Residual maleic acid content was 0.7%, residual acrylic acid content was 0.01% and residual vinyl acetate content was 0.07%. The biodegradation of the resultant polymer was 9.6% based on a BOD test conducted for 30 days.

EXAMPLE 6

The procedure of Example 5 was repeated except that 50 grams of 2hydroxyethyl methacrylate was substituted for the vinyl acetate. The resultant pH 7.2 polymer solution had a solids content of 41.4% and a Brookfield viscosity of 930 cps. at 25° C. Based on GPC, the Mw was 18,500 and the Mn was 5,580. Residual maleic acid content was 0.6%, residual acrylic acid content was 0.01% and residual hydroxyethyl methacrylate content was less than 0.01%. The biodegradation of the resultant polymer was 7.0% based on a BOD test conducted for 30 days.

EXAMPLE 7

To a three liter four neck flask equipped with a mechanical stirrer, reflux condenser and addition funnels, were added 650 grams of deionized water and 16 grams of a 0.15% by weight solution of iron sulfate heptahydrate dissolved in deionized water. This solution was heated to 90°±3° C., at which time a monomer solution of 460 grams of deionized water, 650 grams of glacial acrylic acid and 295.6 grams of maleic anhydride, an initiator solution of 150 grams of deionized water, 50 grams of sodium persulfate and 33.4 grams of 30% hydrogen peroxide and a neutralizing solution of 600 grams of 50% sodium hydroxide, 50 equivalent percent based on the monomers, were fed into the flask linearly and separately over 2.5 hours, maintaining the temperature at 90°±3° C. The temperature was held at 90° C. for an additional 30 minutes after which time 29 grams of acrylic acid and 5 grams of sodium persulfate dissolved in 45 grams of deionized water were added linearly and separately over 30 minutes. When the addition was complete, the system was cooled to 70° C. over 30 minutes. At 70° C., the solution pH was adjusted to about 7 with the addition of 560 grams of a 40% solution of NaOH in water.

The resultant pH 7 polymer solution had a solids content of 40.0% and a Brookfield viscosity of 550 cps. at 25° C. Based on GPC, the Mw was 17,600 and the Mn was 5,210. Residual maleic acid content was 0.2% and residual acrylic acid content was less than 0.01%.

EXAMPLE 8

To a one liter four neck flask equipped with a mechanical stirrer, reflux condenser and addition funnels, were added 240 grams of deionized water and 16 grams of a 0.15% by weight solution of copper sulfate dissolved in deionized water. This solution was heated to reflux, at which time a monomer solution of 200 grams of glacial acrylic acid and 42.2 grams of maleic anhydride, an initiator solution of 83.3 grams of 30% hydrogen peroxide and a neutralizing solution of 145.5 grams of 50% sodium hydroxide, 50 equivalent percent based on the monomers, were fed into the flask linearly and separately over 2 hours, maintaining reflux. Refluxing was continued for an additional 30 minutes after which time the solution pH was adjusted to about 7 with the addition of 120 grams of a 50% solution of NaOH in water.

The resultant pH 7.3 polymer solution had a solids content of 41.3% and a Brookfield viscosity of 300 cps. at 25° C. Based on GPC, the Mw was 4,080 and the Mn was 2,620. Residual maleic acid content was 0.4% and residual acrylic acid content was less than 0.1%.

EXAMPLE 9

To a two liter four neck flask equipped with a mechanical stirrer, reflux condenser and addition funnels, were added 500 grams of deionized water and 4 grams of a 0.15% by weight solution of copper sulfate pentahydrate dissolved in deionized water. This solution was heated to reflux, at which time a monomer solution of 400 grams of glacial acrylic acid and 100 grams of itaconic acid, an initiator solution of 20.8 grams of 30% hydrogen peroxide and a neutralizing solution of 412 grams of 50% sodium hydroxide, 75 equivalent percent based on the monomers, were fed into the flask linearly and separately over 3 hours, maintaining reflux. When the addition was complete, the system was cooled to 60° C. over 30 minutes. At 60° C., the solution pH was adjusted to about 7 with the addition of 81 grams of a 50% solution of NaOH in water followed by the addition of 100 grams of water.

The resultant pH 7 polymer solution had a solids content of 42.9% and a Brookfield viscosity of 30,600 cps. at 25° C. Based on GPC, the Mw was 59,700 and the Mn was 14,000. Residual itaconic acid content was 0.04% and residual acrylic acid content was 0.64%.

EXAMPLE 10

To a two liter four neck flask equipped with a mechanical stirrer, reflux condenser and addition funnels, were added 480 grams of deionized water and 32 grams of a 0.15% by weight solution of copper sulfate pentahydrate dissolved in deionized water. This solution was heated to reflux, at which time a monomer solution of 400 grams of glacial acrylic acid and 84.4 grams of maleic anhydride, an initiator solution of 166.6 grams of 30% hydrogen peroxide and a neutralizing solution of 290.8 grams of 50% sodium hydroxide in 20 grams of deionized water, 75 equivalent percent based on the monomers, were fed into the flask linearly and separately over 3 hours, maintaining reflux. When the addition was complete, the system was cooled to 50° C. over 30 minutes. At 50° C., the solution pH was adjusted to about 7 with the addition of 197.6 grams of a 50% solution of NaOH.

The resultant pH 7 polymer solution had a solids content of 40.9% and a Brookfield viscosity of 250 cps. at 25° C. Based on GPC, the Mw was 4,080 and the Mn was 2,620. Residual maleic acid content was 0.48% and residual acrylic acid content was 0.11%.

EXAMPLE 11

To a two liter four neck flask equipped with a mechanical stirrer, reflux condenser and addition funnels, were added 500 grams of deionized water and 32 grams of a 0.15% by weight solution of copper sulfate pentahydrate dissolved in deionized water. This solution was heated to 90°±3° C., at which time a monomer solution of 400 grams of glacial acrylic acid and 100 grams of itaconic acid, an initiator solution of 166.3 grams of 30% hydrogen peroxide and a neutralizing solution of 412 grams of 50% sodium hydroxide in 100 grams of deionized water, 75 equivalent percent based on the monomers, were fed into the flask linearly and separately over 3 hours while maintaining the temperature at 90°±3° C. When the addition was complete, the system was cooled to 60° C. over 30 minutes. At 60° C., the solution pH was adjusted to about 7 with the addition of 81.2 grams of a 50% solution of NaOH.

The resultant pH 7 polymer solution had a solids content of 37.6% and a Brookfield viscosity of 100 cps. at 25° C. Based on GPC, the Mw was 2,550 and the Mn was 1,660. Residual itaconic acid content was less than 0.01% and residual acrylic acid content was 0.06%.

The results of the following Examples, 12-36, are summarized in Tables 1-3. The goal of Examples 12-36 was to optimize the present invention in an effort to further reduce the amount of metal activator needed to control the molecular weight of the product and to keep the residual monomer level to a minimum.

Examples 12-21

To a 2000 ml four necked round bottom flask was added 250 ml deionized (DI) water and 2.6 ml of a 0.5% solution of copper nitrate ($Cu(NO_3)_2.3H_2O$). The solution was heated to 92–96° C. and the following cofeeds were then added uniformly and linearly to the flask while maintaining the reaction temperature at about 92–96° C.; a sodium maleate solution containing 327 grams of a 50% sodium hydroxide solution, 181 grams of maleic anhydride and 305 grams DI water; 390 grams glacial acrylic acid; and a catalyst solution containing 6.1 grams of sodium persulfate, 34 grams of 35% hydrogen peroxide and 50 grams of DI water. The cofeed solutions were all started at the same time. The total times for the addition of the cofeed solutions were varied and are shown in Table 1.

After the feeds were completed, the temperature was maintained for 1 hour before cooling to about 65° C.–75° C. Once cooled, a series of chasers were added consisting of adding 10 grams of sodium metabisulfite in about 30 grams of DI water followed by the addition of 7 grams acrylic acid. Then the following chaser sequence of adding 2 grams of t-butyl hydroperoxide and 2 grams sodium metabisulfite in about 4 grams of water was performed and then repeated two more times. The batch was then cooled to 55° C. and 352 grams of a 50% solution of sodium hydroxide was added with good agitation and cooling.

The residual monomer levels were measured and are compiled in Table 1 along with the molecular weights of the copolymers.

TABLE 1

| Example | Addition Times, Min. | | | Mw | Residual, % | |
|---|---|---|---|---|---|---|
| | Maleate | AA | Catalyst | | AA (Before / After CHASER) | Maleic (Before / After CHASER) |
| 12 | 240 | 240 | 240 | 22,000 | 1.4/0.1 | 2.2/0.5 |
| 13 | 240 | 240 | 240 | 38,000 | 0.7/0.13 | 2.7/1.0 |
| 14 | 180 | 180 | 180 | 28,000 | 0.18/0.11 | 2.1/0.88 |
| 15 | 180 | 180 | 180 | 30,000 | 0.16/0.10 | 2.2/0.98 |
| 16 | 150 | 180 | 180 | 20,000 | 0.18/mil | 1.26/0.05 |
| 17 | 150 | 180 | 180 | 22,000 | 0.1/mil | 1.1/0.05 |
| 18 | 120 | 180 | 180 | 25,000 | 0.06/0.02 | 0.79/0.17 |
| 19 | 120 | 180 | 180 | 24,000 | 0.06/0.02 | 0.72/0.14 |
| 20* | 90 | 180 | 180 | 16,000 | 0.30/0.14 | 0.760.37 |
| 21* | 60 | 180 | 180 | 15,000 | 0.30/0.08 | 0.5/0.02 |

*The only chaser step used was the addition of 10 grams of sodium metabisulfite in 30 grams of DI water.

Example 22–26

To a 2000 ml four necked round bottom flask was added 240 ml deionized (DI) water and 2.6 ml of a 0.5% solution of copper nitrate. The solution was heated to 92–96° C. and the following cofeeds were added uniformly and linearly to the flask while maintaining the reaction temperature at about 92–96° C.; a sodium maleate solution containing 327 grams of a 50% sodium hydroxide solution, 181 grams of maleic anhydride and 305 grams DI water; 376 grams glacial acrylic acid; and a catalyst solution containing sodium persulfate or hydrogen peroxide or both and 40 grams of DI water. The amount of sodium persulfate and hydrogen peroxide contained in the catalyst feed was varied and is shown in Table 2. All the feeds were started at approximately the same time and the sodium maleate feed was completed in 120 minutes, the acrylic acid feed was completed in 180 minutes and the catalyst feed was completed in 240 minutes.

After the feeds were completed, the temperature was maintained for 1 hour before cooling to about 65° C.–75° C. Once cooled, a series of chasers were added consisting of adding 10 grams of sodium metabisulfite in about 30 grams of DI water followed by the addition of 21 grams acrylic acid. Then the following chaser sequence of adding 2 grams of t-butyl hydroperoxide and 2 grams sodium metabisulfite in about 4 grams of water was repeated three times. The batch was then cooled to 55° C. and 352 grams of a 50% solution of sodium hydroxide was added with good agitation and cooling.

The residual monomer levels are compiled in Table 2 and are compared to the experimental variables.

TABLE 2

| Example | $H_2O_2$, % | NaPS, % | Mw | Residual, % | |
|---|---|---|---|---|---|
| | | | | AA (Before / After CHASER) | Maleic (Before / After CHASER) |
| 22 | 0 | 4 | 19,200 | 0.14/0.10 | 0.24/.001 |
| 23 | 0.25 | 4 | 15,600 | 0.25/0.06 | 2.3/0.56 |
| 24 | 0.50 | 4 | 16,300 | 0.130.04 | 1.9/0.20 |
| 25 | 2 | 1 | 22,700 | 0.11/0.04 | 0.98/0.09 |
| 26 | 3 | 0 | 29,700 | 0.19/0.22 | 2.2/1/20 |

Example 27-38

To a 2000 ml four necked round bottom flask was added 250 ml deionized (DI) water and heated to 92-96° C. The following cofeeds were added uniformly and linearly to the flask while maintaining the reaction temperature at about 92-96° C.; a sodium maleate solution containing 327 grams of a 50% sodium hydroxide solution, 181 grams of maleic anhydride and 305 grams DI water; 376 grams glacial acrylic acid; and a catalyst solution containing sodium persulfate, hydrogen peroxide and 60 grams DI water. The amount of sodium persulfate and hydrogen peroxide contained in the catalyst feed was varied and is shown in Table 3. The cofeed solutions were all started at the same time. The total times for the addition of the cofeed solutions were varied and are also shown in Table 3. An additional feed solution containing 0.013 grams of copper nitrate in 2.6 grams of DI water was added as a "single shot" during the reaction. The time of addition of this metal activator solution was varied and is shown in Table 3.

After the feeds were completed, the temperature was maintained for 1 hour before cooling to about 65° C.-75° C. Once cooled, a chaser sequences consisting of adding 30 grams of sodium metabisulfite in about 90 grams of DI water followed by the addition of 21 grams acrylic acid. Then the following chaser sequence of adding 2 grams of t-butyl hydroperoxide and 2 grams sodium metabisulfite in about 4 grams of water was repeated three times. The batch was then cooled to 55° C. and 352 grams of a 50% solution of sodium hydroxide was added with good agitation and cooling.

The residual monomer levels are compiled in Table 3 and are compared to the experimental variables.

of the of blend was used so that the amount of polymer present in the slurry corresponded to the initial dosage in Table 4. The cup was then placed on a Hamilton Beach multimixer at low speed, and 490 grams of dry clay were added. Once all the clay had been added, the speed was increased to high and the mixture was allowed to stir for an additional 5 minutes. Then 500 grams of the slurry was transferred from the mixing cup to a pint jar and allowed to cool to ambient temperature. The slurry was then mixed for 1 minute at low speed on the multimixer and then the viscosity was measure using a Brookfield model DV-II viscometer at 20 RPM (spindle #2). The reading was taken one minute after starting the viscometer. After the initial reading, more of the blend was added to the slurry to increase the concentration of polymer by 0.0125% (based on the clay solids), followed by the addition of enough clay to keep the slurry at 70% solids. The slurry was again mixed for one minute on the multimixer at low speed and the viscosity measured. This procedure was repeated until two consecutive additions result in an increased viscosity. The optimum dosage is defined as the dosage which gave the lowest viscosity.

TABLE 4

Effect of Maleate Polymers as Clay Dispersants

| Polymer | Dosage of Polymer vs. Viscosity (cps.) | | | | | |
|---|---|---|---|---|---|---|
| | .1625 | .175 | .1875 | .20 | .2125 | .225 |
| Example 9 | 1130 | 890 | 730 | 392 | 344 | 246 |
| Example 10 | 680 | 320 | 286 | 282 | 296 | 290 |
| Example 11 | 845 | 730 | 348 | 328 | 340 | |

EXAMPLE 40

TABLE 3

| Example | Addition Times, Min. | | | H₂O₂ % | NaPS % | MW | Time of Cu Addition Min* | Residual, % | |
|---|---|---|---|---|---|---|---|---|---|
| | Maleate | AA | Catalyst | | | | | AA | Maleic |
| | | | | | | | | (Before / After CHASER) | |
| 27 | 120 | 180 | 240 | 0.5 | 4 | 16,300 | 0 | 0.13/0.04 | 1.9/0.3 |
| 28 | 120 | 180 | 240 | 0.5 | 4 | 34,500 | +90 | 0.05/mil | 0.6/0.004 |
| 29 | 120 | 180 | 240 | 0.5 | 4 | 47,400 | +120 | 0.03/mil | 0.26/0.002 |
| 30 | 120 | 180 | 240 | 0.5 | 4 | 54,900 | +165 | 0.13/mil | 0.05/0.001 |
| 31 | 90 | 180 | 240 | 0.5 | 4 | 25,100 | +90 | 0.14/0.01 | 0.26/0.018 |
| 32 | 90 | 180 | 240 | 0.5 | 4 | 39,900 | +120 | 0.01/mil | 0.04/0.003 |
| 33 | 60 | 180 | 180 | 2 | 1 | 15,000 | 0 | 0.3/0.08 | 0.5/0.2 |
| 34 | 60 | 180 | 180 | 2 | 1 | 28,500 | +100 | 0.3/— | 0.2/— |
| 35 | 60 | 180 | 180 | 2 | 1 | 28,500 | +100 | 0.04/— | 0.12/— |
| 36 | 90 | 180 | 180 | 2 | 1 | 15,000 | 0 | 0.3/0.14 | 0.8/0.37 |
| 37 | 90 | 180 | 180 | 2 | 1 | 41,000 | +100 | 0.2/— | 0.4/— |
| 38 | 90 | 180 | 180 | 2 | 1 | 32,400 | +100 | 0.04/— | 0.22/— |

*Cu was added as one shot at the specified time after polymerization began. When the time of the addition is 0, Cu was contained in the initial charge.

Example 39

Determination of Clay Dispersancy

The polymers of Examples 9, 10, and 11 were examined for their ability to act as clay dispersant. Table 4 is a compilation of the viscosity data of various clay slurries containing these polymers. The following is the procedure used to generate these data.

The first step in preparing the clay slurry was to prepare a polymer/blend stock solution. This was done by mixing the polymer with soda ash and deionized water to yield 100 grams of solution. Two blends were prepared, one containing 10% polymer and 15% soda ash, and one containing 15% polymer and 10% soda ash. A clay slurry was then prepared by adding a portion of the blend to a mixing cup along with deionized water so that the total weight was 210 grams. Enough

Semi-Continuous Polymerization

To a two liter, Tour neck flask equipped with a mechanical stirrer, reflux condenser, addition funnels, and a bottom outlet, was added 200 grams of deionized water. The water was heated to 96°±3° C., at which time a monomer solution containing 1,275 grams of deionized water, 1,392 grams of glacial acrylic acid, 710 grams of maleic anhydride and 9 grams of a 0.5% by weight solution of copper nitrate trihydrate, an initiator solution containing 234 grams of deionized water and 210 grams of 35% hydrogen peroxide, and a neutralizing solution containing 1,284 grams of 50% sodium hydroxide and 360 grams of deionized water, were added to the flask linearly and separately, while maintaining the temperature at 96°±3° C. After 90 minutes, approximately one third (⅓) of each of these solutions had been added and as they continued to be added, an additional feed containing 400 grams of deionized water was started at a rate of 200 grams of deionized water per 90 minutes. Simultaneously to the start of the addition of the deionized water, the bottom outlet valve was opened and the contents of the reaction flask were drained at a rate which maintained the total weight of the reactor flask at 2,024.7 grams. After a total elapse time of 270 minutes, all the feeds were finished and the remaining 2,024.7 grams of solution in the flask continued to drain at the same rate over 90 minutes while maintaining the temperature at 96°±3° C.

The product from the first kettle was fed into a second kettle where the temperature was maintained at 96°±3° C. To each 350 grams of product from the first kettle was added 9.7 grams of glacial acrylic acid and 12.2 grams of 35% hydrogen peroxide. After a residence time of at least 90 minutes, the polymer solution was fed into a third kettle and held at 96°±3° C. until the polymerization was complete and only trace amounts of monomer remain. Finally, the solution was cooled to 70° C. over 30 minutes and the pH was adjusted to about 7 by the addition of 280 grams of a 40% solution of NaOH in water.

The resultant pH 7.9 polymer solution had a solids content of 40.8% and a Brookfield viscosity of 1,375 cps. at 25° C. Based on GPC, the Mw was 26,900 and the Mn was 6,00. Residual maleic acid content was less than 0.05% and residual acrylic acid content was less than 0.15%.

EXAMPLE 41 (Comparative-The Heel Process)

To a two liter four neck flask equipped with a mechanical stirrer, reflux condenser and addition funnels, were added 148 grams of maleic anhydride, 470 grams of deionized water and 8.3 grams of a 0.15% by weight solution of iron sulfate heptahydrate dissolved in deionized water. To the flask was gradually added 242 grams of 50% sodium hydroxide. The solution was heated to 90°±3° C., at which time 325 grams of glacial acrylic acid, and an initiator solution of 65 grams of deionized water, 5 grams of sodium persulfate and 45 grams of 30% hydrogen peroxide were fed into the flask linearly and separately over 3 hours while maintaining the temperature at 90°±3° C. When the addition was complete, the system was cooled to 70° C., 310 grams of deionized water was added as a dilution, and then the system was cooled to room temperature.

The resultant pH 4 polymer solution had a solids content of 40.0% and a Brookfield viscosity of 1,500 cps. at 25° C. Based GPC, the Mw was 25,000 and the Mn was 8,800. Residual maleic acid content was 0.13% and residual acrylic acid content was less than 0.1%.

EXAMPLE 42 (Incrustation Inhibition)

This example is an illustration of the incrustation inhibiting properties of a detergent containing a novel copolymer of this invention and a comparison of said detergents to detergents containing copolymers produced according to the heel process of the prior art.

Laundered in a European style home washing machine were 3 kg. of cotton and cotton/polyester fabric which included two terry towels. To the 90° C. wash water which had a hardness of 350 ppm Ca/Mg (3/1) was added 0.8% by weight of a typical European soda ash/Zeolite detergent containing 3% by weight of the copolymer of this invention. The towels were laundered for the indicated number of cycles (Table 5), ashed at 800° C. for 2 hours and the inorganic content (incrustation) determined. The results are shown in Table 5.

TABLE 5

Effect of Polymer in Residue Reduction

| Polymer | % Ash on Fabric | |
|---|---|---|
| | 10 Wash Cycles | 25 Wash Cycles |
| Example 41 (heel process) | 1.1 | 1.8 |
| Example 40 (continuous) | 0.8 | 1.5 |
| Sokalan CP-5 ® (registered trademark of BASF) | 1.1 | 1.8 |

The compositions of this invention can be useful as detergent additives, antiscalants, deflocculants, dispersants, drilling fluid aids used in oil drilling operations, and especially useful as incrustation inhibitors.

We claim:

1. A detergent composition comprising a water soluble detergent compound selected from the group consisting of anionic, nonionic, zwitterionic, ampholytic detergent compounds and mixtures thereof; a builder selected from the group consisting of alkali metal salts of carboxy methyloxysuccinic acid and oxydiacetic acid, tetrasodium and tetrapotassium pyrophosphate, pentasodium and pentapotassium tripolyphosphates, ether polycarboxylates, citrates, starch or cellulose derived from polycarboxylates, polyacrylic acids and mixtures thereof;

and from 0.1% up to about 35% by weight of a water-soluble copolymer prepared by a process comprising:

(a) establishing an initial charge of water in a reactor;

(b) gradually cofeeding into the reactor monomers (A),(B) and optionally (C), polymerization initiators and neutralizer, where said monomer (A) comprises: from 5 to 65%, by weight based on the total amount of the monomers, of at least one monomer selected from the group consisting of monoethylenically unsaturated dicarboxylic acids containing from 4 to 6 carbon atoms per monomer molecule, the salts of said dicarboxylic acids and the anhydrides of said dicarboxylic acids, and where said monomer (A) is added to said reactor simultaneously with said monomer (B) for at least 25% of the time; where said monomer (B) comprises from 35 to 95% by weight based on the total amount of the monomers of a monoethylenically unsaturated monocarboxylic acid containing from 3 to 6 carbon atoms per monomer molecule; and where said monomer (C) comprises up to 35% by weight based on the total amount of the monomers of an unsaturated carboxyl-free monomer;

(c) adding from 1 to 220 ppm, based on the total weight of said monomers, of a metal salt activator to said reactor wherein the metal salt activator can be contained in the initial charge, adding during the addition of the monomers, added after the addition of one or more of said monomers or a combination thereof;

(d) running said reaction at a temperature of from about 80 to 150° C.; and (e) recovering said copolymer from said reactor.

2. The detergent composition of claim 1 wherein the level of the water-soluble copolymer in the final detergent composition is from 0.1 to 20% by weight.

3. The detergent composition of claim 1 wherein the level of the water-soluble copolymer in the final detergent composition is from 0.5 to 5.0% by weight.

4. The detergent composition of claim 1 wherein the monomer (A) concentration ranges from 10 to 60% by weight based on the total amount of the monomers.

5. The detergent composition of claim 1 wherein the monomer (A) is selected from the group consisting of maleic acid, itaconic acid, mesaconic acid, fumaric acid, citraconic acid, salts thereof, anhydrides thereof and combinations thereof.

6. The detergent composition of claim 1 wherein the monomer (A) is maleic acid, its salts and its anhydride.

7. The detergent composition of claim 1 wherein the monocarboxylic acid monomer is selected from the group consisting of acrylic acid, methacrylic acid, vinyl acetic acid, crotonic acid and acryloxypropionic acid.

8. The detergent composition of claim 1 wherein the monocarboxylic acid monomer is acrylic acid.

9. The detergent composition of claim 1 wherein the carboxyl-free monomer is selected from the group consisting of alkyl esters of acrylic or methacrylic acids; hydroxyalkyl esters of acrylic or methacrylic acids; acrylamide, methacrylamide, N-tertiary butyl acrylamide, N-methyl acrylamide, N,N-dimethyl acrylamide; acrylonitrile, methacrylonitrile, allyl alcohol, allyl sulfonic acid, allyl phosphonic acid, vinylphosphonic acid, dimethylaminoethyl acrylate, dimethylaminoethyl methacrylate, phosphoethyl methacrylate, N-vinyl pyrollidone, N-vinylformamide, N-vinylimidazole, ethylene glycol diacrylate, trimethylolpropane triacrylate, diallyl phthalate, vinyl acetate, styrene, vinyl sulfonic acid and its salts, and 2-acrylamido-2-methyl propane sulfonic acid and its salts.

* * * * *